US007653408B1

(12) United States Patent
Kopikare et al.

(10) Patent No.: US 7,653,408 B1
(45) Date of Patent: Jan. 26, 2010

(54) SELF-ADAPTIVE TRANSMIT POWER CONTROL FOR WIRELESS NETWORK

(75) Inventors: Milind Kopikare, Sunnyvale, CA (US); Brian Bosso, San Jose, CA (US); Lawrence Tse, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 748 days.

(21) Appl. No.: 10/962,376

(22) Filed: Oct. 8, 2004

(51) Int. Cl.
*H04B 7/00* (2006.01)
(52) U.S. Cl. ........................ 455/522; 455/69
(58) Field of Classification Search ................ 455/522, 455/69; 370/311
See application file for complete search history.

(56) References Cited

U.S. PATENT DOCUMENTS 7,257,094 B2 * 8/2007 Shoemake .................. 370/311

OTHER PUBLICATIONS

IEEE 802.20, Draft 802.20 Permanent Document; System Requirements for IEEE 802.20 Mobile Broadband Wireless Access Systems—Version 14; Jul. 16, 2004, 24 pages.
"802.16 IEEE Standard for Local and Metropolitan Area Networks; Part 16: Air Interface for Fixed Broadband Wireless Access Systems," 802.16 IEEE Standard for Local and Metropolitan Area Networks, Oct. 1, 2004, pp. i-xxxiv and pp. 1-857, IEEE Std 802.16-2004, IEEE, United States.
ANSI/IEEE 802.11, Information technology—Telecommunications and information exchange between systems—Local and metropolitan area networks—Specific requirements, Part 11: Wireless LAN Medium Access Control (MAC) and Physical Layer (PHY) specifications, 1999 Edition, pp. 1-512.
IEEE P802.11g/D8.2 Draft Supplement to Standard for Information technology—Telecommunications and information exchange between systems—Local and metropolitan area networks—Specific requirements, Part 11: Wireless LAN Medium Access Control (MAC) and Physical Layer (PHY) specifications, Further Higher Data Rate Extension in the 2.4 GHz Band, Apr. 2003, pp. 1-69.
IEEE std. 802.11a, Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications, High-speed Physical Layer in the 5 GHz Band, Adopted by the ISO/IEC and redesignated as ISO/IEC 8802-11: 1999/Amd 1:2000(E), pp. 1-83.
IEEE std. 802.11b, Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications: Higher-Speed Physical Layer Extension in the 2.4 GHz Band, Sep. 16, 1999, pp. 1-89.

(Continued)

*Primary Examiner*—Quochien B Vuong

(57) ABSTRACT

A wireless network apparatus includes a receive circuit, a transmit circuit, and a processor. The receive circuit receives a first signal over a wireless link. The first signal represents packets of first data. The transmit circuit transmits a second signal over the wireless link at a power level indicated by a transmit power control signal. The second signal represents packets of second data. The processor determines a link quality of the wireless link based on the first signal. The processor selects one of a plurality of link quality thresholds based on the power level. The processor compares the link quality to the selected one of the plurality of link quality thresholds. The processor generates the transmit power control signal based on the comparison.

104 Claims, 7 Drawing Sheets

OTHER PUBLICATIONS

IEEE std. 802.16, IEEE Standard for Local and Metropolitan area networks, Part 16: Air Interface for Fixed Broadband Wireless Access Systems, IEEE Computer Society and the IEEE Microwave Theory and Techniques Society, Apr. 8, 2002, pp. 1-322.

* cited by examiner

SELF-ADAPTIVE TRANSMIT POWER CONTROL FOR WIRELESS NETWORK

BACKGROUND

The present invention relates generally to wireless data communications. More particularly, the present invention relates to a self-adaptive method for transmit power control in a wireless network.

Many wireless network devices such as laptop computers are battery-powered to provide the mobility permitted by wireless networks such as those specified by IEEE 802.11, 802.11a, 802.11b, 802.11g, 802.11n, 802.16 and 802.20. For this reason, such portable wireless network devices must use power efficiently to permit long operation times. With respect to the wireless link, this involves controlling the transmit power of the wireless network device to maintain throughput levels with distance, maintain the quality and integrity of the signal, mitigate interference effects to other users, and maximize the signal-to-noise ratio of the signal.

SUMMARY

In general, in one aspect, the invention features a wireless network apparatus and corresponding method and computer program. It comprises a receive circuit to receive a first signal over a wireless link, the first signal representing packets of first data; a transmit circuit to transmit a second signal over the wireless link at a power level indicated by a transmit power control signal, the second signal representing packets of second data; and a processor to determine a link quality of the wireless link based on the first signal, and to generate the transmit power control signal based on the link quality.

Particular implementations can include one or more of the following features. The processor determines the link quality of the wireless link based on at least one of the group consisting of a signal strength of the first signal; a signal quality of the first signal; a packet error rate of the packets of first data; and a current transmit power level of the second signal. The transmit circuit transmits the second signal over the wireless link at a data rate indicated by a transmit data rate control signal; and wherein the processor generates the transmit data rate control signal based on the link quality. The processor determines the link quality of the wireless link based on at least one of the group consisting of a signal strength of the first signal; a signal quality of the first signal; a packet error rate of the packets of first data; a current transmit power level of the second signal; and a current transmit data rate of the second signal. The wireless network apparatus further comprises an antenna in communication with the receive circuit and the transmit circuit. The processor asserts a decrease power state of the transmit power control signal when the link quality of the wireless link exceeds a predetermined link quality, and a current transmit power level of the second signal is greater than a maximum transmit power level for a next higher transmit data rate of the first data; and the transmit circuit decreases a power of the second signal in response to the decrease power state of the transmit power control signal. The processor increases a rate of transmission of the first data when the link quality of the wireless link exceeds a predetermined link quality, and a current transmit power level of the second signal is not greater than a maximum transmit power level for a next higher transmit data rate of the first data. The processor asserts an increase power state of the transmit power control signal when the link quality of the wireless link does not exceed a predetermined link quality, and a current transmit power level of the second signal is less than a maximum transmit power level for the current transmit data rate of the first data; and the transmit circuit increases the power of the second signal in response to the increase power state of the transmit power control signal. The processor decreases a rate of transmission of the first data when the link quality of the wireless link does not exceed a predetermined link quality, and a current transmit power level of the second signal is not less than a maximum transmit power level for the current transmit data rate of the first data. The processor asserts a decrease power state of the transmit power control signal when a packet error rate of the first packets of data does not exceed a predetermined packet error rate threshold, the signal strength of the first signal exceeds a predetermined signal strength threshold, and a current transmit power level of the second signal is greater than a maximum transmit power level for a next higher transmit data rate of the first data; and the transmit circuit decreases a power of the second signal in response to the decrease power state of the transmit power control signal. The predetermined packet error rate threshold and the predetermined signal strength threshold are selected based on a current transmit power level of the second signal. The processor increases a rate of transmission of the first data when a packet error rate of the first packets of data does not exceed a predetermined packet error rate threshold, a signal strength of the first signal exceeds a predetermined signal strength threshold, and a current transmit power level of the second signal is not greater than a maximum transmit power level for a next higher transmit data rate of the first data. The predetermined packet error rate threshold and the predetermined signal strength threshold are selected based on a current transmit power level of the second signal. The processor asserts an increase power state of the transmit power control signal when a packet error rate of the first packets of data exceeds a predetermined packet error rate threshold, the signal strength of the first signal does not exceed a predetermined signal strength threshold, and a current transmit power level of the second signal is less than a maximum transmit power level for the current transmit data rate of the first data; and the transmit circuit increases the power of the second signal in response to the increase power state of the transmit power control signal. The predetermined packet error rate threshold and the predetermined signal strength threshold are selected based on a current transmit power level of the second signal. The processor decreases a rate of transmission of the first data when a packet error rate of the first packets of data exceeds a predetermined packet error rate threshold, a signal strength of the first signal does not exceed a predetermined signal strength threshold, and a current transmit power level of the second signal is not less than a maximum transmit power level for the current transmit data rate of the first data. The predetermined packet error rate threshold and the predetermined signal strength threshold are selected based on a current transmit power level of the second signal. An integrated circuit comprises the wireless network apparatus. A wireless network device comprises the wireless network apparatus. A wireless client comprises the wireless network device. A wireless access point comprises the wireless network device. The wireless network device is otherwise compliant with at least one standard selected from the group consisting of IEEE standards 802.11, 802.11a, 802.11b, 802.11g, 802.11n, 802.16, and 802.20. The receive circuit comprises a media access controller receive circuit; and a physical-layer device receive circuit. The transmit circuit comprises a media access controller transmit circuit; and a physical-layer device transmit circuit.

In general, in one aspect, the invention features a wireless network apparatus and corresponding method and computer program. It comprises a receive circuit to receive a first signal over a wireless link, the first signal representing packets of first data; a processor to determine a link quality of the wireless link based on the first signal; and a transmit circuit to transmit a second signal over the wireless link at a data rate based on the link quality of the wireless link, the second signal representing packets of second data.

Particular implementations can include one or more of the following features. The processor determines the link quality of the wireless link based on at least one of the group consisting of a signal strength of the first signal; a signal quality of the first signal; a packet error rate of the packets of first data; and a current transmit power level of the second signal. The wireless network apparatus further comprises an antenna in communication with the receive circuit and the transmit circuit. An integrated circuit comprises the wireless network apparatus. A wireless network device comprises the wireless network apparatus. A wireless client comprises the wireless network device. A wireless access point comprises the wireless network device. The wireless network device is otherwise compliant with at least one standard selected from the group consisting of IEEE standards 802.11, 802.11a, 802.11b, 802.11g, 802.11n, 802.16, and 802.20.

The details of one or more implementations are set forth in the accompanying drawings and the description below. Other features will be apparent from the description and drawings, and from the claims.

Figure 1:
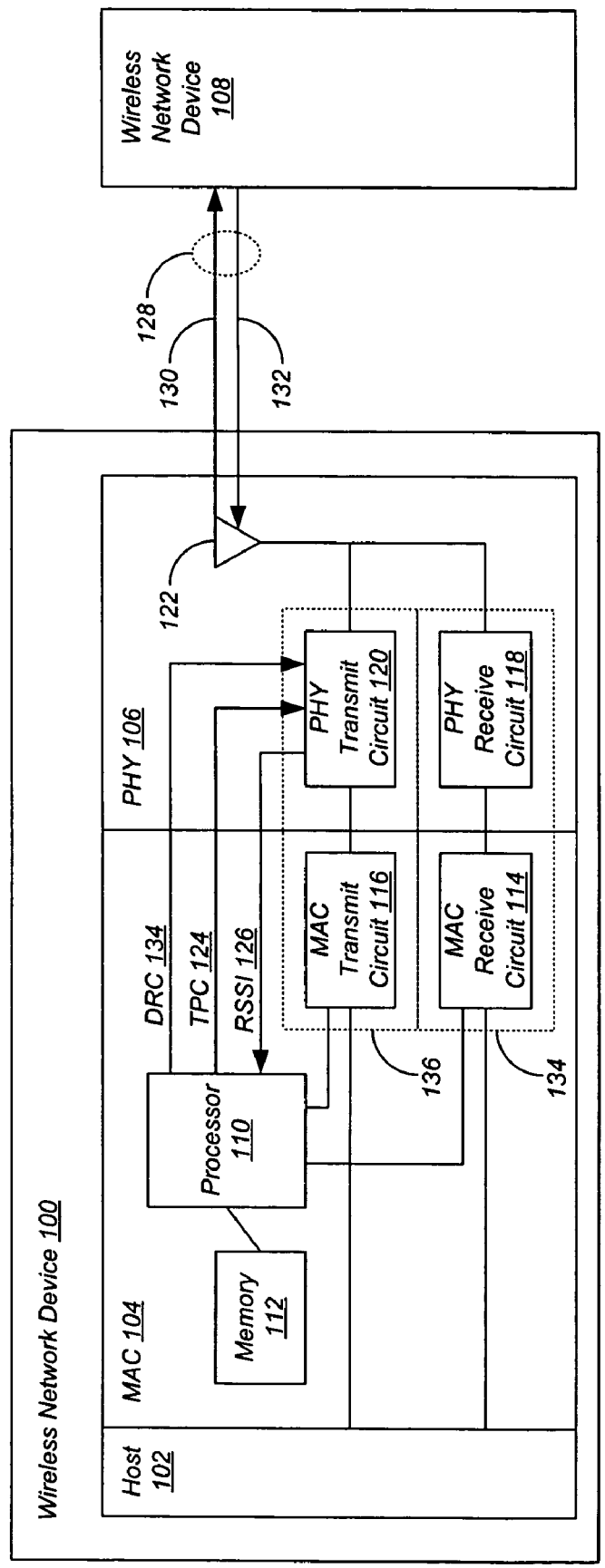
FIG. 1 shows a wireless network device in communication with another wireless network device according to a preferred embodiment of the present invention.

The leading digit(s) of each reference numeral used in this specification indicates the number of the drawing in which the reference numeral first appears.

DETAILED DESCRIPTION

Conventional wireless devices, on detecting a wireless link of insufficient quality, for example by detecting a failed transmission of a packet, simply repeat the transmission of the packet until the packet is successfully transmitted. This method wastes considerable power and time. In contrast, embodiments of the present invention, on detecting a wireless link of insufficient quality, adjust the power level and/or data rate of the transmitted signal to obtain successful transmissions. The techniques employed, described in detail below, can result in a reduction of power consumption of 30%-40% compared to conventional methods. In addition, these techniques provide reduced interference and enhanced security.

Embodiments of the present invention provide power and/or data rate control for a transmitted signal in a wireless network such as an IEEE 802.11, 802.11a, 802.11b, 802.11g, 802.11n, 802.16 or 802.20 wireless local-area network, a personal-area network such as a Bluetooth network, and other sorts of wireless networks and communication links. In particular, the power level and/or data rate of the transmitted signal are controlled based on a link quality of the wireless link. In a preferred embodiment, the link quality is determined based on the packet error rate of packets in the transmitted signal and the signal strength of received signals, as described in detail below. In some embodiments the power level of the transmitted signal is controlled based on the packet error rate of packets in the transmitted signal, the signal strength of received signals, and a current transmit power level of the transmitted signal, also as described in detail below.

FIG. 1 shows a wireless network device 100 in communication with another wireless network device 108 according to a preferred embodiment of the present invention. Wireless network devices 100 and 108 can be wireless clients, wireless access points, or other sorts of wireless network devices. Wireless network device 100 is preferably otherwise compliant with at least one standard selected from the group consisting of IEEE standards 802.11, 802.11a, 802.11b, 802.11g, 802.11n, 802.16, and 802.20.

Wireless network device 100 comprises a host 102 such as a laptop computer, personal digital assistant, and the like, a media access controller (MAC) 104, a physical-layer device (PHY) 106, and an antenna 122. MAC 104 comprises a processor 110, a memory 112, a MAC receive circuit 114, and a MAC transmit circuit 116. PHY 106 comprises a PHY receive circuit 118 and a PHY transmit circuit 120. MAC receive circuit 114 and PHY receive circuit 118 together define a receive circuit 134. MAC transmit circuit 116 and PHY transmit circuit 120 together define a transmit circuit 136.

Figure 2:
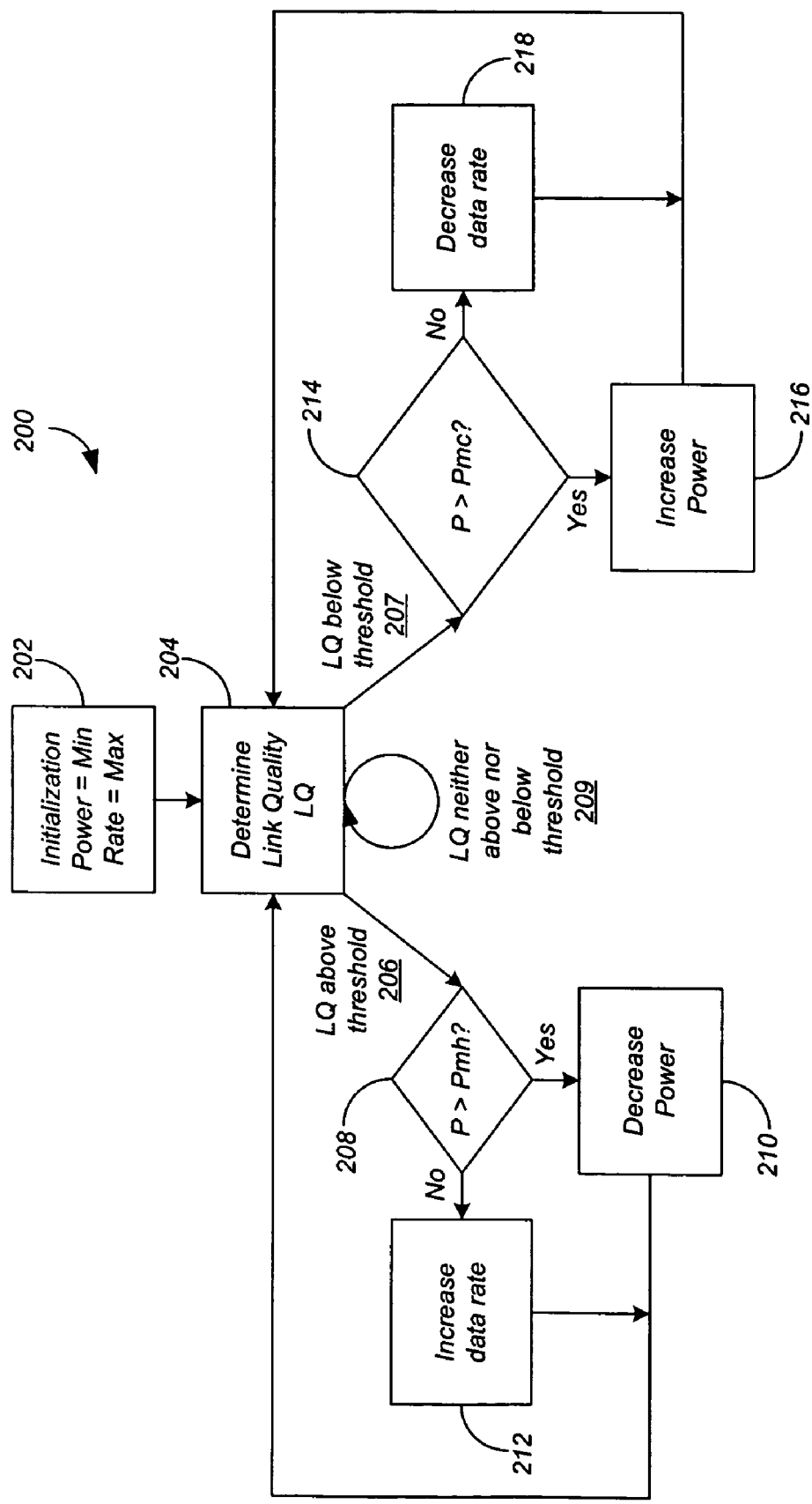
FIG. 2 shows a transmit power control process for the wireless network device of FIG. 1 according to a preferred embodiment.

FIG. 2 shows a transmit power control process 200 for wireless network device 100 according to a preferred embodiment. Processor 110 initializes wireless network device 100 by setting the power level of the signal transmitted by wireless network device 100 to its minimum power level, and by setting the data rate of the data transmitted by wireless network device 100 to its maximum rate (step 202). Processor 110 preferably sets the power level of the transmitted signal by asserting a predetermined state of a transmit power control (TPC) signal 124, although other methods can be used. PHY transmit circuit 120 sets the power level according to TPC signal 124. Processor 110 preferably sets the data rate of the transmitted signal by asserting a predetermined state of a data rate control (DRC) signal 134, although other methods can be used. PHY transmit circuit 120 sets the data rate according to DRC signal 134.

Processor 110 then determines the link quality of the link 128 between wireless network device 100 and wireless network device 108 (step 204). In preferred embodiments the determination of link quality is based on a packet error rate (PER) of the signal 130 transmitted by wireless network device 100 to wireless network device 108 and a received signal strength indication (RSSI) 126 of the signal 132 received by wireless network device 100 from wireless network device 108.

Processor 110 compares the link quality to one or more predetermined link qualities. In a preferred embodiment the link quality threshold comprises a packet error rate threshold and a signal strength threshold. In some embodiments multiple such thresholds can be used to provide hysteresis. Preferably the thresholds are selected based on the current power level of the transmitted signal 130.

Figure 3:
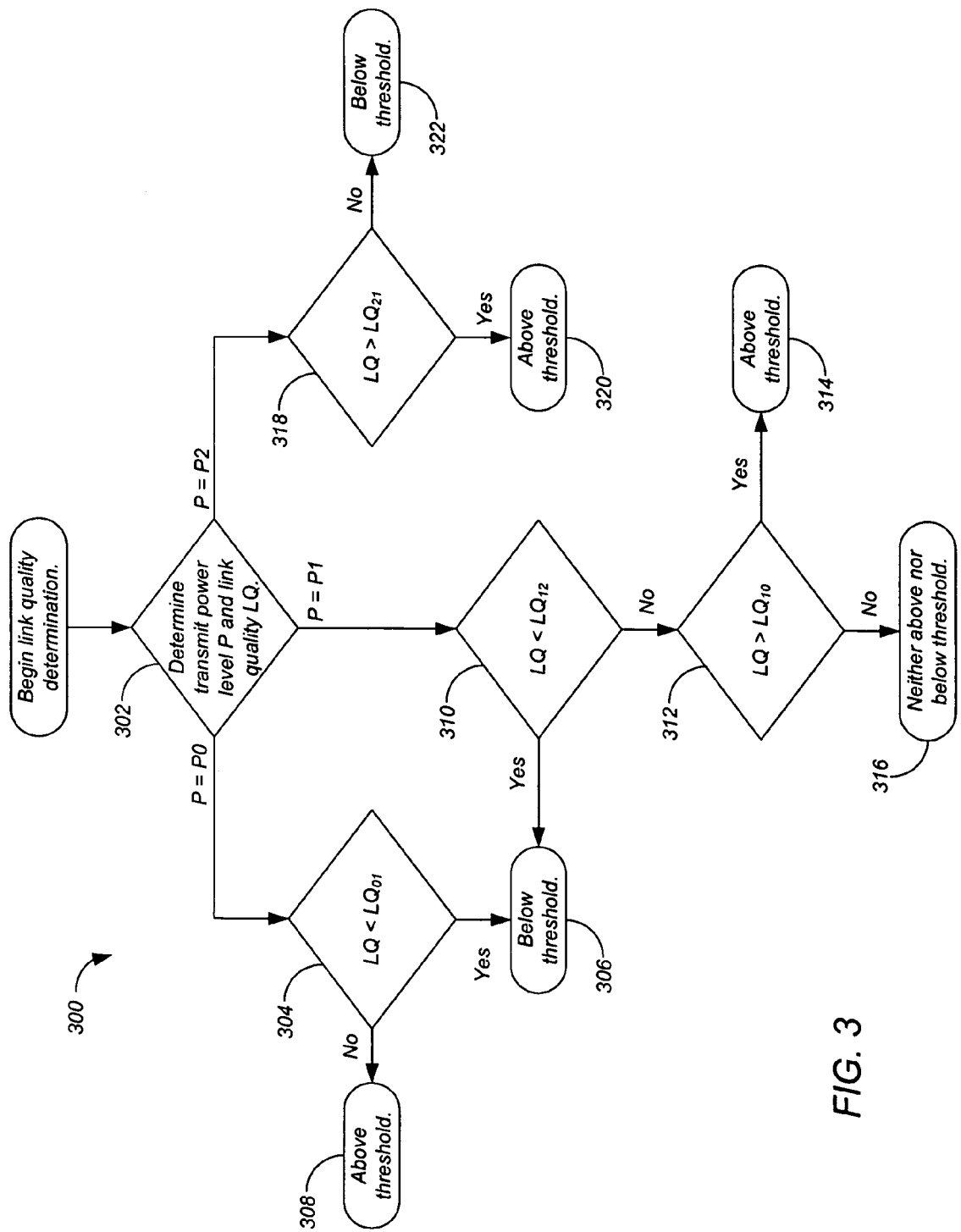
FIG. 3 shows a process for determining a link quality according to a preferred embodiment.
Figure 4:
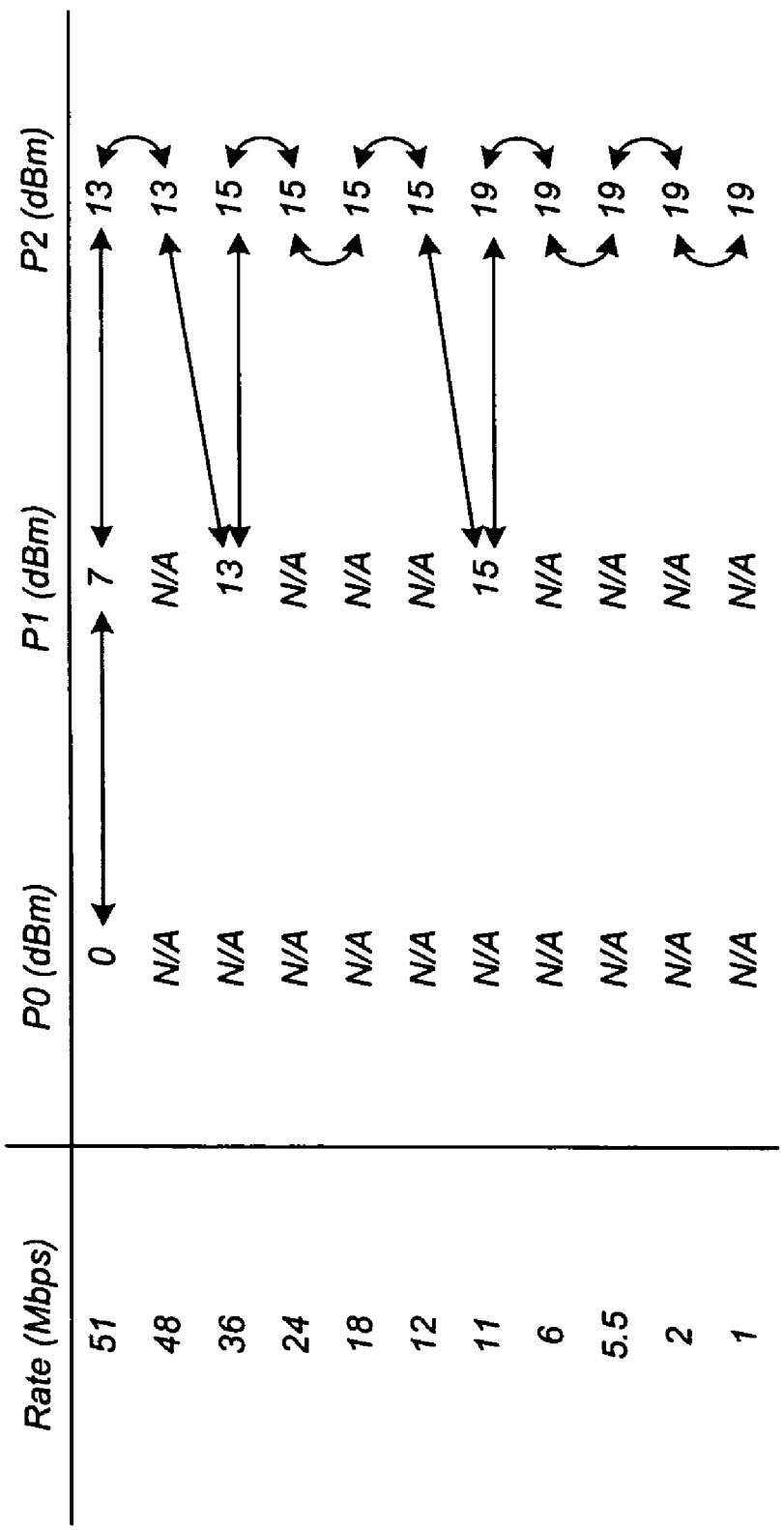
FIG. 4 shows a table of the power levels for each data rate according to a preferred embodiment.

FIG. 3 shows a process 300 for determining a link quality according to a preferred embodiment. Of course, other processes can be used. For example, assume that physical-layer transmit circuit 120 is capable of transmitting at three different power levels P0, P1, and P2, where P0<P1<P2 and otherwise complies with at least one of IEEE 802.11, 802.11a, 802.11b, 802.11g, 802.11n, 802.16 and 802.20. FIG. 4 shows a table of the power levels for each data rate according to a preferred embodiment. Note that some of the data rates have only one or two possible power levels. Thus there is only one possible path through the table, as shown by the arrows in FIG. 4. This path reflects the fact that, when increasing the data rate, it is necessary to first decrease the transmitted power to avoid distortion in the transmitted waveform.

Process 300 first determines the transmit power level P of the transmitted signal 130 and the link quality LQ of wireless link 128 (step 302). The link quality LQ can be determined based on a signal strength of received signal 132, a signal quality of received signal 132, a packet error rate of the packets of data in received signal 132, a current transmit power level of transmitted signal 130, a current transmit data rate of transmitted signal 130, other such criteria, or any combination thereof. If P=P0, then the link quality LQ is compared to a predetermined link quality $LQ_{01}$ (step 304). The link quality LQ is determined to be below threshold when $LQ<LQ_{01}$ (step 306) and above threshold otherwise (step 308). In a preferred embodiment, the threshold determination is made based on a RSSI threshold $RSSI_{01}$ and a PER threshold $PER_{01}$. In particular, the link quality is determined to be below threshold when $RSSI \leq RSSI_{01}$ or $PER \geq PER_{01}$, and above threshold otherwise.

But if at step 302 P=P1, then the link quality LQ is compared to a predetermined link quality $LQ_{12}$ (step 310). The link quality LQ is determined to be below threshold when $LQ<LQ_{12}$ (step 306). In a preferred embodiment, the threshold determination is made based on a RSSI threshold $RSSI_{12}$ and a PER threshold $PER_{12}$. In particular, the link quality is determined to be below threshold when $RSSI<RSSI_{12}$ or $PER \geq PER_{12}$. But if at step 306 $LQ \geq LQ_{12}$, then the link quality LQ is compared to a predetermined link quality $LQ_{10}$ (step 312). The link quality LQ is determined to be below threshold when $LQ>LQ_{10}$ (step 314) and neither above nor below threshold otherwise (step 316). In a preferred embodiment, the threshold determination is made based on a RSSI threshold $RSSI_{10}$ and a PER threshold $PER_{10}$. In particular, the link quality is determined to be above threshold when $RSSI \geq RSSI_{10}$ and $PER \leq PER_{10}$, and neither above nor below threshold otherwise.

But if at step 302 P=P2, then the link quality LQ is compared to a predetermined link quality $LQ_{21}$ (step 318). The link quality LQ is determined to be above threshold when $LQ>LQ_{21}$ (step 320) and below threshold otherwise (step 322). In a preferred embodiment, the threshold determination is made based on a RSSI threshold $RSSI_2$, and a PER threshold $PER_{21}$. In particular, the link quality is determined to be above threshold when $RSSI \geq RSSI_{21}$ and $PER \leq PER_{21}$, and below threshold otherwise.

Example numbers for thresholds $RSSI_{01}$, $RSSI_{12}$, $RSSI_{21}$, $RSSI_{10}$, $PER_{01}$, $PER_{12}$, $PER_{21}$ and $PER_{10}$ are given below in Table 1 for an IEEE 802.11a link and a IEEE 802.11g link. Of course these numbers are given for example only, and should not be considered limiting.

TABLE 1

|  | IEEE 802.11a | IEEE 802.11g |
| --- | --- | --- |
| $RSSI_{01}$ | 19 dB | 40 dB |
| $RSSI_{12}$ | 9 dB | 32 dB |
| $RSSI_{21}$ | 11 dB | 42 dB |
| $RSSI_{10}$ | 21 dB | 34 dB |
| $PER_{01}$ | 25% | 25% |
| $PER_{12}$ | 25% | 25% |
| $PER_{21}$ | 16% | 15% |
| $PER_{10}$ | 16% | 15% |

Returning to FIG. 2, if in step 204 the link quality is determined to be above threshold (206), process 200 determines whether the current transmit power level P is greater than the maximum power level Pmh for the next higher data rate (step 208). If the current transmit power level is greater than the maximum power level for the next higher data rate, process 200 decreases the power level of transmitted signal 130 (step 210), and resumes at step 204.

Figure 5:
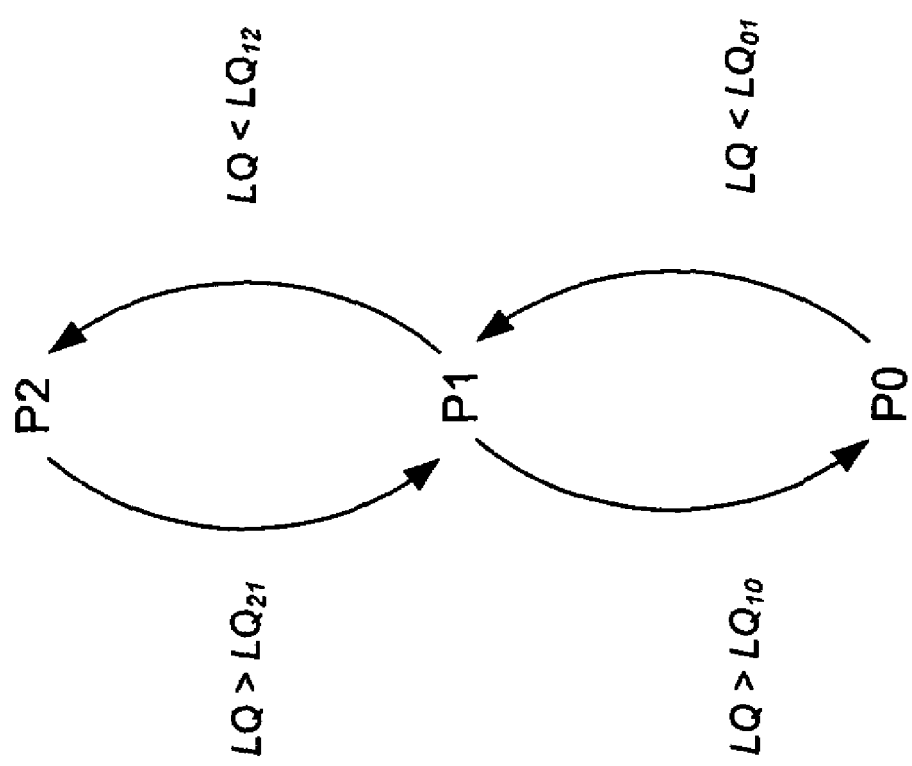
FIG. 5 shows a flow diagram for embodiments in which the only the power level of the transmitted signal is adjusted.

In other embodiments, processor 110 adjusts only the data rate of transmitted signal 130 based on the link quality. In still other embodiments, processor 110 adjusts only the power level of transmitted signal 130 based on the link quality, for example as illustrated by the flow diagram of FIG. 5.

Figure 6:
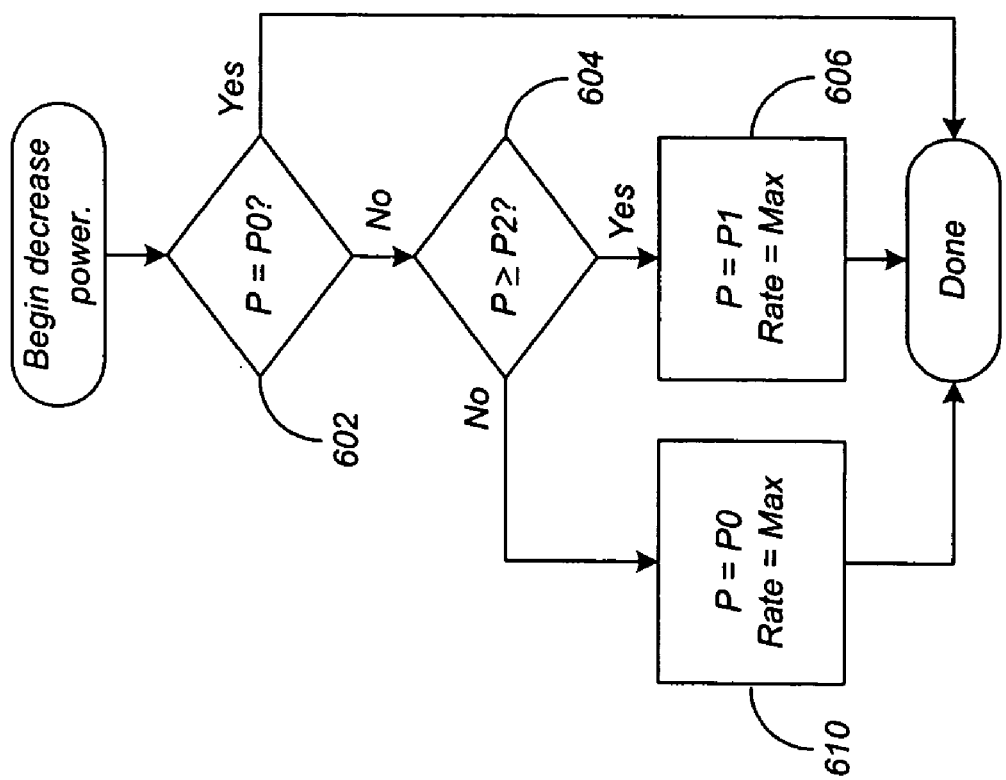
FIG. 6 shows a process for decreasing the power level of a transmitted signal for a wireless network device having three transmit power levels P0, P1, and P2 where P0<P1<P2 according to a preferred embodiment.

FIG. 6 shows a process 600 for decreasing the power level of transmitted signal 130 for a wireless network device having three transmit power levels P0, P1, and P2 where P0<P1<P2 according to a preferred embodiment. Of course, other processes can be used. If the transmit power level P of the transmitted signal 130 is equal to P0 (step 602), then process 600 ends because the power level is already at its minimum level. Otherwise if the transmit power level P of the transmitted signal 130 is greater than, or equal to, P2 (step 604), then process 600 sets the transmit power level to P1 and sets the data rate of the transmitted signal to its maximum rate (step 606). However if at step 604 the transmit power level P of the transmitted signal 130 is less than P2, process 600 sets the transmit power level to P0 and sets the data rate of the transmitted signal to its maximum rate (step 610).

However, returning again to FIG. 2, if at step 208 process 200 determines that the current transmit power level is not greater than the maximum power level for the next higher data rate then process 200 increases the data rate (step 212) and resumes at step 204. Any process can be used to increase the data rate.

Process 200 can use multiple link quality thresholds at step 204 to provide hysteresis, for example as described above with respect to FIG. 5. Therefore process 200 can determine that the link quality is neither above nor below the link quality thresholds (209). In that case, no action is taken, and process 200 repeats step 204.

On the other hand, if at step 204 process 200 determines that the link quality is below the link quality threshold (207), process 200 compares the power level of transmitted signal 130 to respective predetermined values (step 214). In other embodiments, other criteria are used. If the current transmit power level P is less than the maximum power level Pmc for the current data rate then process 200 increases the power level of transmitted signal 130 (step 216), and returns to step 204.

Figure 7:
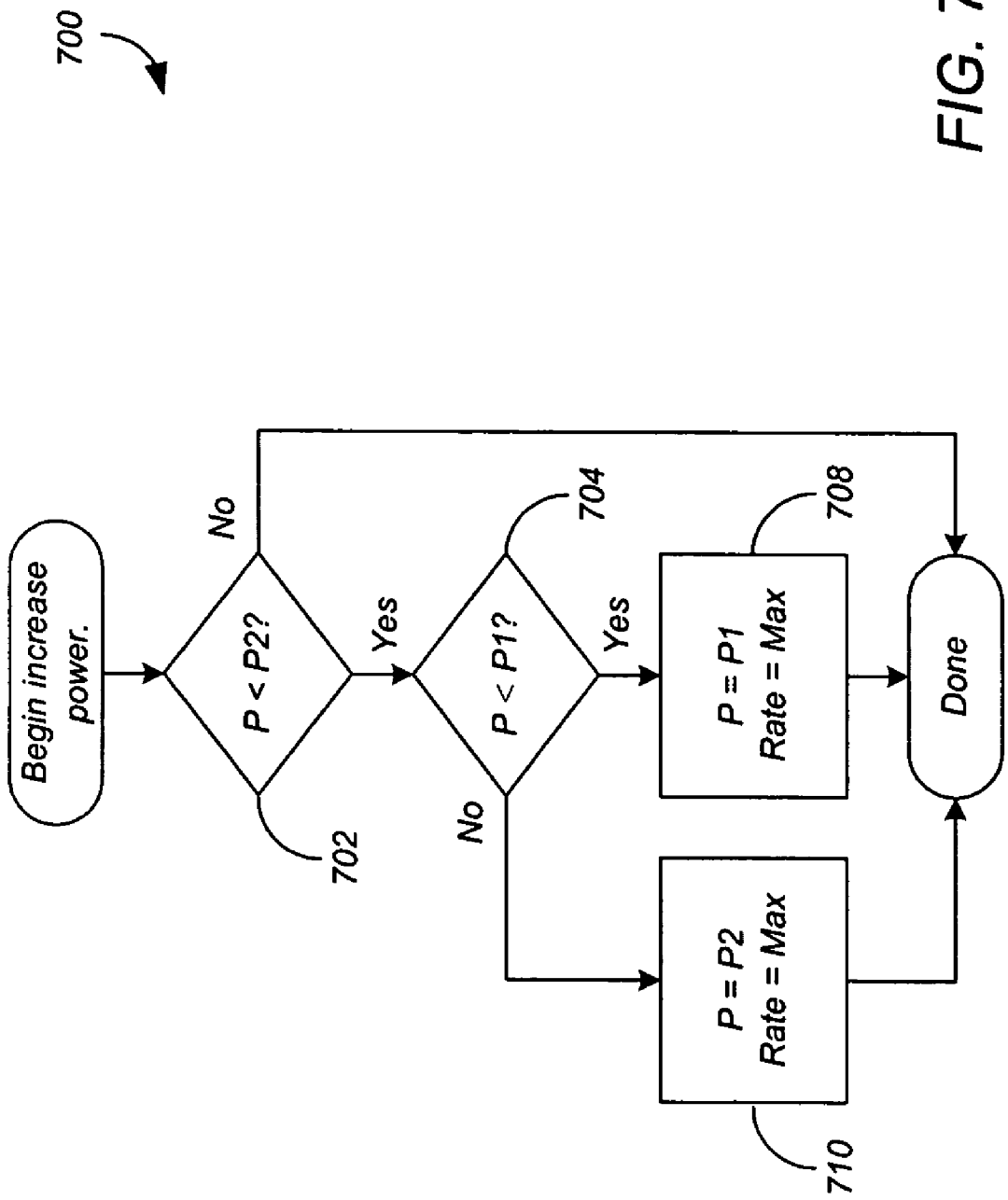
FIG. 7 shows a process for increasing the power level of a transmitted signal for a wireless network device having three transmit power levels P0, P1, and P2 where P0<P1<P2 according to a preferred embodiment.

FIG. 7 shows a process 700 for increasing the power level of transmitted signal 130 for a wireless network device having three transmit power levels P0, P1, and P2 where P0<P1<P2 according to a preferred embodiment. Of course, other processes can be used. If the transmit power level P of the transmitted signal 130 is not less than P2 (step 702), then process 700 ends because the power level is already at its maximum level. Otherwise if the transmit power level P of the transmitted signal 130 is less than P1 (step 704), then process 700 sets the transmit power level to P1 and sets the data rate of the transmitted signal to its maximum rate (step 706). However if at step 704 the transmit power level P of the transmitted signal 130 is greater than, or equal to, P1, process 700 sets the transmit power level to P2 and sets the data rate of the transmitted signal to its maximum rate (step 710).

However, returning again to FIG. 2, if at step 214 process 200 determines that the current transmit power level P is not less than the maximum power level Pmc for the current data rate, then process 200 decreases the data rate (step 218) and resumes at step 204. Any process can be used to decrease the data rate.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A wireless network apparatus comprising:
    a receive circuit to receive a first signal over a wireless link, the first signal representing packets of first data;
    a transmit circuit to transmit a second signal over the wireless link at a power level indicated by a transmit power control signal, the second signal representing packets of second data; and
    a processor to determine a link quality of the wireless link based on the first signal, to select one of a plurality of link quality thresholds based on the power level, to compare the link quality to the selected one of the plurality of link quality thresholds, and to generate the transmit power control signal based on the comparison.

2. The wireless network apparatus of claim 1, wherein the processor determines the link quality of the wireless link based on at least one of the group consisting of:
    a signal strength of the first signal;
    a signal quality of the first signal;
    a packet error rate of the packets of first data; and
    a current transmit power level of the second signal.

3. The wireless network apparatus of claim 1:
    wherein the transmit circuit transmits the second signal over the wireless link at a data rate indicated by a transmit data rate control signal; and
    wherein the processor generates the transmit data rate control signal based on the link quality.

4. The wireless network apparatus of claim 3, wherein the processor determines the link quality of the wireless link based on at least one of the group consisting of:
    a signal strength of the first signal;
    a signal quality of the first signal;
    a packet error rate of the packets of first data;
    a current transmit power level of the second signal; and
    a current transmit data rate of the second signal.

5. The wireless network apparatus of claim 1, further comprising:
    an antenna in communication with the receive circuit and the transmit circuit.

6. The wireless network apparatus of claim 1:
    wherein the processor asserts a decrease power state of the transmit power control signal when
        the link quality of the wireless link exceeds a predetermined link quality, and
        a current transmit power level of the second signal is greater than a maximum transmit power level for a next higher transmit data rate of the first data; and
    wherein the transmit circuit decreases a power of the second signal in response to the decrease power state of the transmit power control signal.

7. The wireless network apparatus of claim 1:
    wherein the processor increases a rate of transmission of the first data when
        the link quality of the wireless link exceeds a predetermined link quality, and
        a current transmit power level of the second signal is not greater than a maximum transmit power level for a next higher transmit data rate of the first data.

8. The wireless network apparatus of claim 1:
    wherein the processor asserts an increase power state of the transmit power control signal when
        the link quality of the wireless link does not exceed a predetermined link quality, and
        a current transmit power level of the second signal is less than a maximum transmit power level for the current transmit data rate of the first data; and
    wherein the transmit circuit increases the power of the second signal in response to the increase power state of the transmit power control signal.

9. The wireless network apparatus of claim 1:
    wherein the processor decreases a rate of transmission of the first data when
        the link quality of the wireless link does not exceed a predetermined link quality, and
        a current transmit power level of the second signal is not less than a maximum transmit power level for the current transmit data rate of the first data.

10. The wireless network apparatus of claim 1:
wherein the processor asserts a decrease power state of the transmit power control signal when
a packet error rate of the first packets of data does not exceed a predetermined packet error rate threshold,
the signal strength of the first signal exceeds a predetermined signal strength threshold, and
a current transmit power level of the second signal is greater than a maximum transmit power level for a next higher transmit data rate of the first data; and
wherein the transmit circuit decreases a power of the second signal in response to the decrease power state of the transmit power control signal.

11. The wireless network apparatus of claim 10:
wherein the predetermined packet error rate threshold and the predetermined signal strength threshold are selected based on a current transmit power level of the second signal.

12. The wireless network apparatus of claim 1:
wherein the processor increases a rate of transmission of the first data when
a packet error rate of the first packets of data does not exceed a predetermined packet error rate threshold,
a signal strength of the first signal exceeds a predetermined signal strength threshold, and
a current transmit power level of the second signal is not greater than a maximum transmit power level for a next higher transmit data rate of the first data.

13. The wireless network apparatus of claim 12:
wherein the predetermined packet error rate threshold and the predetermined signal strength threshold are selected based on a current transmit power level of the second signal.

14. The wireless network apparatus of claim 1:
wherein the processor asserts an increase power state of the transmit power control signal when
a packet error rate of the first packets of data exceeds a predetermined packet error rate threshold,
the signal strength of the first signal does not exceed a predetermined signal strength threshold, and
a current transmit power level of the second signal is less than a maximum transmit power level for the current transmit data rate of the first data; and
wherein the transmit circuit increases the power of the second signal in response to the increase power state of the transmit power control signal.

15. The wireless network apparatus of claim 14:
wherein the predetermined packet error rate threshold and the predetermined signal strength threshold are selected based on a current transmit power level of the second signal.

16. The wireless network apparatus of claim 1:
wherein the processor decreases a rate of transmission of the first data when
a packet error rate of the first packets of data exceeds a predetermined packet error rate threshold,
a signal strength of the first signal does not exceed a predetermined signal strength threshold, and
a current transmit power level of the second signal is not less than a maximum transmit power level for the current transmit data rate of the first data.

17. The wireless network apparatus of claim 16:
wherein the predetermined packet error rate threshold and the predetermined signal strength threshold are selected based on a current transmit power level of the second signal.

18. An integrated circuit comprising the wireless network apparatus of claim 1.

19. A wireless network device comprising the wireless network apparatus of claim 1.

20. A wireless client comprising the wireless network device of claim 19.

21. A wireless access point comprising the wireless network device of claim 19.

22. A wireless network device according to claim 19 which is otherwise compliant with at least one standard selected from the group consisting of IEEE standards 802.11, 802.11a, 802.11b, 802.11g, 802.11n, 802.16, and 802.20.

23. The wireless network apparatus of claim 1, wherein the receive circuit comprises:
a media access controller receive circuit; and
a physical-layer device receive circuit.

24. The wireless network apparatus of claim 1, wherein the transmit circuit comprises:
a media access controller transmit circuit; and
a physical-layer device transmit circuit.

25. A wireless network apparatus comprising:
receive means for receiving a first signal over a wireless link, the first signal representing packets of first data;
transmit means for transmitting a second signal over the wireless link at a power level indicated by a transmit power control signal, the second signal representing packets of second data; and
processing means for determining a link quality of the wireless link based on the first signal, for selecting one of a plurality of link quality thresholds based on the power level, for comparing the link quality to the selected one of the plurality of link quality thresholds, and for generating the transmit power control signal based on the comparison.

26. The wireless network apparatus of claim 25, wherein the processing means determines the link quality of the wireless link based on at least one of the group consisting of:
a signal strength of the first signal;
a signal quality of the first signal;
a packet error rate of the packets of first data; and
a current transmit power level of the second signal.

27. The wireless network apparatus of claim 25:
wherein the transmit means transmits the second signal over the wireless link at a data rate indicated by a transmit data rate control signal; and
wherein the processing means generates the transmit data rate control signal based on the link quality.

28. The wireless network apparatus of claim 27, wherein the processing means determines the link quality of the wireless link based on at least one of the group consisting of:
a signal strength of the first signal;
a signal quality of the first signal;
a packet error rate of the packets of first data;
a current transmit power level of the second signal; and
a current transmit data rate of the second signal.

29. The wireless network apparatus of claim 25, further comprising:
antenna means for communicating with the receive means and the transmit means.

30. The wireless network apparatus of claim 25:
wherein the processing means asserts a decrease power state of the transmit power control signal when
the link quality of the wireless link exceeds a predetermined link quality, and
a current transmit power level of the second signal is greater than a maximum transmit power level for a next higher transmit data rate of the first data; and wherein the transmit means decreases a power of the second signal in response to the decrease power state of the transmit power control signal.

31. The wireless network apparatus of claim 25:
wherein the processing means increases a rate of transmission of the first data when
the link quality of the wireless link exceeds a predetermined link quality, and
a current transmit power level of the second signal is not greater than a maximum transmit power level for a next higher transmit data rate of the first data.

32. The wireless network apparatus of claim 25:
wherein the processing means increases a rate of transmission of the first data when
the link quality of the wireless link exceeds a predetermined link quality, and
a current transmit power level of the second signal is not greater than a maximum transmit power level for a next higher transmit data rate of the first data; and
wherein the transmit means increases the power of the second signal in response to the increase power state of the transmit power control signal.

33. The wireless network apparatus of claim 25:
wherein the processing means decreases a rate of transmission of the first data when
the link quality of the wireless link does not exceed a predetermined link quality, and
a current transmit power level of the second signal is not less than a maximum transmit power level for the current transmit data rate of the first data.

34. The wireless network apparatus of claim 25:
wherein the processing means asserts a decrease power state of the transmit power control signal when
a packet error rate of the first packets of data does not exceed a predetermined packet error rate threshold,
the signal strength of the first signal exceeds a predetermined signal strength threshold, and
a current transmit power level of the second signal is greater than a maximum transmit power level for a next higher transmit data rate of the first data; and
wherein the transmit means decreases a power of the second signal in response to the decrease power rate of the transmit power control signal.

35. The wireless network apparatus of claim 34:
wherein the predetermined packet error rate threshold and the predetermined signal strength threshold are selected based on a current transmit power level of the second signal.

36. The wireless network apparatus of claim 25:
wherein the processing means increases a rate of transmission of the first data when
a packet error rate of the first packets of data does not exceed a predetermined packet error rate threshold,
a signal strength of the first signal exceeds a predetermined signal strength threshold, and
a current transmit power level of the second signal is not greater than a maximum transmit power level for a next higher transmit data rate of the first data.

37. The wireless network apparatus of claim 36:
wherein the predetermined packet error rate threshold and the predetermined signal strength threshold are selected based on a current transmit power level of the second signal.

38. The wireless network apparatus of claim 25:
wherein the processing means asserts an increase power state of the transmit power control signal when
a packet error rate of the first packets of data exceeds a predetermined packet error rate threshold, the signal strength of the first signal does not exceed a predetermined signal strength threshold, and
a current transmit power level of the second signal is less than a maximum transmit power level for the current transmit data rate of the first data; and
wherein the transmit circuit increases the power of the second signal in response to the increase power state of the transmit power control signal.

39. The wireless network apparatus of claim 38:
wherein the predetermined packet error rate threshold and the predetermined signal strength threshold are selected based on a current transmit power level of the second signal.

40. The wireless network apparatus of claim 25:
wherein the processing means decreases a rate of transmission of the first data when
a packet error rate of the first packets of data exceeds a predetermined packet error rate threshold,
a signal strength of the first signal does not exceed a predetermined signal strength threshold, and
a current transmit power level of the second signal is not less than a maximum transmit power level for the current transmit data rate of the first data.

41. The wireless network apparatus of claim 40:
wherein the predetermined packet error rate threshold and the predetermined signal strength threshold are selected based on a current transmit power level of the second signal.

42. An integrated circuit comprising the wireless network apparatus of claim 25.

43. A wireless network device comprising the wireless network apparatus of claim 25.

44. A wireless client comprising the wireless network device of claim 43.

45. A wireless access point comprising the wireless network device of claim 43.

46. A wireless network device according to claim 43 which is otherwise compliant with at least one standard selected from the group consisting of IEEE standards 802.11, 802.11a, 802.11b, 802.11g, 802.11n, 802.16, and 802.20.

47. A method for a wireless network apparatus comprising:
receiving a first signal over a wireless link, the first signal representing packets of first data;
determining a link quality of the wireless link based on the first signal;
selecting one of a plurality of link quality thresholds based on a power level of the wireless network apparatus for transmitting signals over the wireless link;
comparing the link quality to the selected one of the plurality of link quality thresholds,
generating a transmit power control signal based on the comparison; and
transmitting a second signal over the wireless link at the power level indicated by the transmit power control signal, the second signal representing packets of second data.

48. The method of claim 47, wherein the link quality of the wireless link is determined based on at least one of the group consisting of:
a signal strength of the first signal;
a signal quality of the first signal;
a packet error rate of the packets of first data; and
a current transmit power level of the second signal.

49. The method of claim 47, further comprising:
transmitting the second signal over the wireless link at a data rate based on the link quality of the wireless link.

50. The method of claim 49, wherein the link quality of the wireless link is determined based on at least one of the group consisting of:
a signal strength of the first signal;
a signal quality of the first signal;
a packet error rate of the packets of first data;
a current transmit power level of the second signal; and
a current transmit data rate of the second signal.

51. The method of claim 47, further comprising:
decreasing the power level of the second signal when
the link quality of the wireless link exceeds a predetermined link quality, and
a current transmit power level of the second signal is greater than a maximum transmit power level for a next higher transmit data rate of the first data.

52. The method of claim 47, further comprising:
increasing a rate of transmission of the first data when
the link quality of the wireless link exceeds a predetermined link quality, and
a current transmit power level of the second signal is not greater than a maximum transmit power level for a next higher transmit data rate of the first data.

53. The method of claim 47, further comprising:
increasing the power level of the second signal when
the link quality of the wireless link does not exceed a predetermined link quality,
a rate of transmission of the first data is at a maximum data rate, and
a current transmit power level of the second signal is less than a maximum transmit power level for the current transmit data rate of the first data.

54. The method of claim 47, further comprising:
decreasing a rate of transmission of the first data when
the link quality of the wireless link does not exceed a predetermined link quality, and
a current transmit power level of the second signal is not less than a maximum transmit power level for the current transmit data rate of the first data.

55. The method of claim 47, wherein the wireless network apparatus is otherwise compliant with at least one standard selected from the group consisting of IEEE standards 802.11, 802.11a, 802.11b, 802.11g, 802.11n, 802.16, and 802.20.

56. The method of claim 47, further comprising:
decreasing the power level of the second signal when
a packet error rate of the first packets of data does not exceed a predetermined packet error rate threshold,
a signal strength of the first signal exceeds a predetermined signal strength threshold, and
a current transmit power level of the second signal is greater than a maximum transmit power level for a next higher transmit data rate of the first data.

57. The method of claim 56, further comprising:
wherein the predetermined packet error rate threshold and the predetermined signal strength threshold are selected based on a current transmit power level of the second signal.

58. The method of claim 47, further comprising:
increasing a rate of transmission of the first data when
a packet error rate of the first packets of data does not exceed a predetermined packet error rate threshold,
a signal strength of the first signal exceeds a predetermined signal strength threshold, and
a current transmit power level of the second signal is not greater than a maximum transmit power level for a next higher transmit data rate of the first data.

59. The method of claim 58, further comprising:
wherein the link quality of the wireless link is determined based on the received signal strength signal, the packet error rate, and a current transmit power level of the second signal.

60. The method of claim 47, further comprising:
increasing the power level of the second signal when
a packet error rate of the first packets of data exceeds a predetermined packet error rate threshold,
a signal strength of the first signal does not exceed a predetermined signal strength threshold,
a current transmit power level of the second signal is less than a maximum transmit power level for the current transmit data rate of the first data.

61. The method of claim 60, further comprising:
wherein the link quality of the wireless link is determined based on the received signal strength signal, the packet error rate, and a current transmit power level of the second signal.

62. The method of claim 47, further comprising:
decreasing a rate of transmission of the first data when
a packet error rate of the first packets of data exceeds a predetermined packet error rate threshold,
a signal strength of the first signal does not exceed a predetermined signal strength threshold, and
a current transmit power level of the second signal is not less than a maximum transmit power level for the current transmit data rate of the first data.

63. The method of claim 62, further comprising:
wherein the link quality of the wireless link is determined based on the received signal strength signal, the packet error rate, and a current transmit power level of the second signal.

64. The method of claim 47, wherein the wireless network apparatus is otherwise compliant with at least one standard selected from the group consisting of IEEE standards 802.11, 802.11a, 802.11b, 802.11g, 802.11n, 802.16, and 802.20.

65. A computer program stored on a computer-readable medium and executed by a processor for a wireless network apparatus comprising:
determining a link quality of a wireless link based on a first signal received by the wireless network apparatus over a wireless link, the first signal representing packets of first data;
selecting one of a plurality of link quality thresholds based on a power level of the wireless network apparatus for transmitting signals over the wireless link;
comparing the link quality to the selected one of the plurality of link quality thresholds; and
controlling a the power level of a second signal transmitted by the wireless network apparatus over the wireless link based on the comparison, of the wireless link, the second signal representing packets of second data.

66. The computer program of claim 65, wherein the link quality of the wireless link is determined based on at least one of the group consisting of:
a signal strength of the first signal;
a signal quality of the first signal;
a packet error rate of the packets of first data; and
a current transmit power level of the second signal.

67. The computer program of claim 65, further comprising:
controlling a data rate of the second signal based on the link quality of the wireless link.

68. The computer program of claim 67, wherein the link quality of the wireless link is determined based on at least one of the group consisting of:
- a signal strength of the first signal;
- a signal quality of the first signal;
- a packet error rate of the packets of first data;
- a current transmit power level of the second signal; and
- a current transmit data rate of the second signal.

69. The computer program of claim 65, further comprising: decreasing the power level of the second signal when
- the link quality of the wireless link exceeds a predetermined link quality, and
- a current transmit power level of the second signal is greater than a maximum transmit power level for a next higher transmit data rate of the first data.

70. The computer program of claim 65, further comprising: increasing a rate of transmission of the first data when
- the link quality of the wireless link exceeds a predetermined link quality, and
- a current transmit power level of the second signal is not greater than a maximum transmit power level for a next higher transmit data rate of the first data.

71. The computer program of claim 65, further comprising: increasing the power level of the second signal when
- the link quality of the wireless link does not exceed a predetermined link quality,
- a rate of transmission of the first data is at a maximum data rate, and
- a current transmit power level of the second signal is less than a maximum transmit power level for the current transmit data rate of the first data.

72. The computer program of claim 65, further comprising: decreasing a rate of transmission of the first data when
- the link quality of the wireless link does not exceed a predetermined link quality, and
- a current transmit power level of the second signal is not less than a maximum transmit power level for the current transmit data rate of the first data.

73. The computer program of claim 65, wherein the wireless network apparatus is otherwise compliant with at least one standard selected from the group consisting of IEEE standards 802.11, 802.11a, 802.11b, 802.11g, 802.11n, 802.16, and 802.20.

74. The computer program of claim 65, further comprising: decreasing the power level of the second signal when
- a packet error rate of the first packets of data does not exceed a predetermined packet error rate threshold,
- a signal strength of the first signal exceeds a predetermined signal strength threshold, and
- a current transmit power level of the second signal is greater than a maximum transmit power level for a next higher transmit data rate of the first data.

75. The computer program of claim 74, further comprising: wherein the predetermined packet error rate threshold and the predetermined signal strength threshold are selected based on a current transmit power level of the second signal.

76. The computer program of claim 65, further comprising: increasing a rate of transmission of the first data when
- a packet error rate of the first packets of data does not exceed a predetermined packet error rate threshold,
- a signal strength of the first signal exceeds a predetermined signal strength threshold, and
- a current transmit power level of the second signal is not greater than a maximum transmit power level for a next higher transmit data rate of the first data.

77. The computer program of claim 76, further comprising: wherein the link quality of the wireless link is determined based on the received signal strength signal, the packet error rate, and a current transmit power level of the second signal.

78. The computer program of claim 65, further comprising: increasing the power level of the second signal when
- a packet error rate of the first packets of data exceeds a predetermined packet error rate threshold,
- a signal strength of the first signal does not exceed a predetermined signal strength threshold, and
- a current transmit power level of the second signal is less than a maximum transmit power level for the current transmit data rate of the first data.

79. The computer program of claim 78, further comprising: wherein the link quality of the wireless link is determined based on the received signal strength signal, the packet error rate, and a current transmit power level of the second signal.

80. The computer program of claim 65, further comprising: decreasing a rate of transmission of the first data when
- a packet error rate of the first packets of data exceeds a predetermined packet error rate threshold,
- a signal strength of the first signal does not exceed a predetermined signal strength threshold, and
- a current transmit power level of the second signal is not less than a maximum transmit power level for the current transmit data rate of the first data.

81. The computer program of claim 80, further comprising: wherein the link quality of the wireless link is determined based on the received signal strength signal, the packet error rate, and a current transmit power level of the second signal.

82. The computer program of claim 65, wherein the wireless network apparatus is otherwise compliant with at least one standard selected from the group consisting of IEEE standards 802.11, 802.11a, 802.11b, 802.11g, 802.11n, 802.16, and 802.20.

83. A wireless network apparatus comprising:
- a receive circuit to receive a first signal over a wireless link, the first signal representing packets of first data;
- a processor to determine a link quality of the wireless link based on the first signal, to select one of a plurality of link quality thresholds based on a power level of the wireless network apparatus for transmitting signals over the wireless link, to compare the link quality to the selected one of the plurality of link quality thresholds, and to generate a transmit data rate control signal based on the comparison; and
- a transmit circuit to transmit a second signal over the wireless link at a data rate based on the transmit data rate control signal, the second signal representing packets of second data.

84. The wireless network apparatus of claim 83, wherein the processor determines the link quality of the wireless link based on at least one of the group consisting of:
- a signal strength of the first signal;
- a signal quality of the first signal;
- a packet error rate of the packets of first data; and
- a current transmit power level of the second signal.

85. The wireless network apparatus of claim 83, further comprising:
- an antenna in communication with the receive circuit and the transmit circuit.

86. An integrated circuit comprising the wireless network apparatus of claim 83.

87. A wireless network device comprising the wireless network apparatus of claim 83.

88. A wireless client comprising the wireless network device of claim 87.

89. A wireless access point comprising the wireless network device of claim 87.

90. A wireless network device according to claim 87 which is otherwise compliant with at least one standard selected from the group consisting of IEEE standards 802.11, 802.11a, 802.11b, 802.11g, 802.11n, 802.16, and 802.20.

91. A wireless network apparatus comprising:
   receive means for receiving a first signal over a wireless link, the first signal representing packets of first data;
   processing means for determining a link quality of the wireless link based on the first signal, for selecting one of a plurality of link quality thresholds based on a power level of the wireless network apparatus for transmitting signals over the wireless link, for comparing the link quality to the selected one of the plurality of link quality thresholds, and for generating a transmit data rate control signal based on the comparison; and
   transmit means for transmitting a second signal over the wireless link at a data rate based on the transmit data rate control signal, the second signal representing packets of second data.

92. The wireless network apparatus of claim 91, wherein the processing means determines the link quality of the wireless link based on at least one of the group consisting of:
   a signal strength of the first signal;
   a signal quality of the first signal;
   a packet error rate of the packets of first data; and
   a current transmit power level of the second signal.

93. The wireless network apparatus of claim 91, further comprising:
   antenna means for communicating with the receive means and the transmit means.

94. An integrated circuit comprising the wireless network apparatus of claim 91.

95. A wireless network device comprising the wireless network apparatus of claim 91.

96. A wireless client comprising the wireless network device of claim 95.

97. A wireless access point comprising the wireless network device of claim 95.

98. A wireless network device according to claim 95 which is otherwise compliant with at least one standard selected from the group consisting of IEEE standards 802.11, 802.11a, 802.11b, 802.11g, 802.11n, 802.16, and 802.20.

99. A method for a wireless network apparatus comprising:
   receiving a first signal over a wireless link, the first signal representing packets of first data;
   determining a link quality of the wireless link based on the first signal; selecting one of a plurality of link quality thresholds based on a power level of the wireless network apparatus for transmitting signals over the wireless link;
   comparing the link quality to the selected one of the plurality of link quality thresholds;
   generating a transmit data rate control signal based on the comparison; and
   transmitting a second signal over the wireless link at a data rate based on the transmit data rate control signal, the second signal representing packets of second data.

100. The method of claim 99, wherein the link quality of the wireless link is determined based on at least one of the group consisting of:
   a signal strength of the first signal;
   a signal quality of the first signal;
   a packet error rate of the packets of first data; and
   a current transmit power level of the second signal.

101. The method of claim 99, wherein the wireless network apparatus is otherwise compliant with at least one standard selected from the group consisting of IEEE standards 802.11, 802.11a, 802.11b, 802.11g, 802.11n, 802.16, and 802.20.

102. A computer program stored on a computer-readable medium and executed by a processor for a wireless network apparatus comprising:
   determining a link quality of a wireless link based on a first signal received by the wireless network apparatus over a wireless link, the first signal representing packets of first data;
   selecting one of a plurality of link quality thresholds based on a power level of the wireless network apparatus for transmitting signals over the wireless link;
   comparing the link quality to the selected one of the plurality of link quality thresholds;
   generating a transmit data rate control signal based on the comparison; and
   controlling a data rate of a second signal transmitted over the wireless link by the wireless network apparatus based on the transmit data rate control signal.

103. The computer program of claim 102, wherein the link quality of the wireless link is determined based on at least one of the group consisting of:
   a signal strength of the first signal;
   a signal quality of the first signal;
   a packet error rate of the packets of first data; and
   a current transmit power level of the second signal.

104. The computer program of claim 102, wherein the wireless network apparatus is otherwise compliant with at least one standard selected from the group consisting of IEEE standards 802.11, 802.11a, 802.11b, 802.11g, 802.11n, 802.16, and 802.20.

* * * * *